(12) United States Patent
Harris et al.

(10) Patent No.: US 10,029,611 B2
(45) Date of Patent: Jul. 24, 2018

(54) RETRACTABLE TRUCK BED LIGHTING SYSTEM

(71) Applicant: Toyota Motor Engineering & Manufacturing North America, Inc., Erlanger, KY (US)

(72) Inventors: Ryan C. Harris, Saline, MI (US); Scott L. Frederick, Brighton, MI (US); Ethan Fassezke, Mason, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 30 days.

(21) Appl. No.: 15/266,108

(22) Filed: Sep. 15, 2016

(65) Prior Publication Data
US 2018/0072219 A1    Mar. 15, 2018

(51) Int. Cl.
*B60Q 1/26* (2006.01)
*B62D 33/023* (2006.01)
*B60Q 1/30* (2006.01)
*B62D 33/02* (2006.01)
*F21S 9/02* (2006.01)
*F21S 8/10* (2006.01)
*F21S 45/50* (2018.01)
(Continued)

(52) U.S. Cl.
CPC ............. *B60Q 1/307* (2013.01); *B62D 33/02* (2013.01); *F21S 9/02* (2013.01); *F21S 45/10* (2018.01); *F21S 45/50* (2018.01); *F21S 48/31* (2013.01); *F21S 48/33* (2013.01); *B60Q 1/2607* (2013.01); *F21Y 2115/10* (2016.08)

(58) Field of Classification Search
CPC ......... B60C 1/2692; B60C 1/24; B60C 1/307; B62D 33/02; B62D 33/023; F21V 21/15; F21V 21/34; F21S 48/211
See application file for complete search history.

(56) References Cited

U.S. PATENT DOCUMENTS 4,851,970 A * 7/1989 Bronder ................. B60Q 1/302
                                                                 362/269
4,894,755 A * 1/1990 Chandler ............. B60Q 1/2692
                                                                 340/472

(Continued)

FOREIGN PATENT DOCUMENTS

CA        2897050 A1    5/2016

*Primary Examiner* — Peggy Neils
(74) *Attorney, Agent, or Firm* — Christopher G. Darrow; Darrow Mustafa PC

(57) ABSTRACT

Described herein are various embodiments of a retractable truck bed lighting system. The lighting system may comprise an illumination device. The illumination device may comprise an upper portion and a lower portion coupled to the upper portion. The upper portion may comprise an upper body, a cap covering a top portion of the upper body, and a diffuser module comprising a light source set within a front wall of the upper body. The lower portion may comprise a lower body surrounding a first cavity, the upper portion fits within the first cavity when the upper portion is in a recessed position and the upper portion extends from the first cavity when the upper portion is in an extended position, and an extension mechanism coupled to the upper portion and the lower portion, the extension mechanism configured to extend the upper portion from the recessed position to the extended position.

20 Claims, 3 Drawing Sheets

(51) Int. Cl.
*F21S 45/10* (2018.01)
*F21Y 115/10* (2016.01)

(56) References Cited

U.S. PATENT DOCUMENTS

| | | | | |
|---|---|---|---|---|
| 5,023,760 A | * | 6/1991 | Izuno | B60Q 1/2692 |
| | | | | 362/485 |
| 5,696,484 A | * | 12/1997 | Kim | B60Q 1/2692 |
| | | | | 340/465 |
| 6,260,990 B1 | | 7/2001 | Saunders | |
| 8,552,852 B1 | * | 10/2013 | Hertz | B60P 3/40 |
| | | | | 340/468 |
| 9,291,324 B2 | * | 3/2016 | Huebner | B60Q 1/24 |
| 2003/0230909 A1 | * | 12/2003 | Melius | B60J 7/067 |
| | | | | 296/98 |
| 2006/0250790 A1 | * | 11/2006 | Mah | F21L 4/027 |
| | | | | 362/157 |

* cited by examiner

RETRACTABLE TRUCK BED LIGHTING SYSTEM

TECHNICAL FIELD

The subject matter described herein relates in general to lighting systems and, more particularly, to retractable truck bed lighting systems.

BACKGROUND

Most trucks have beds for carrying cargo. Sometimes cargo is loaded or unloaded in low-light conditions. Some trucks have a light on the cab of the truck. The light shines from the cab towards that back of the bed. The light shines in the eyes of someone at the end of the bed looking into the bed. If the cargo is tall, little or no light reaches the rear of the bed of the truck.

SUMMARY

This disclosure describes various embodiments of a retractable truck bed lighting system. In one embodiment, the lighting system comprises an illumination device. The illumination device may comprise an upper portion and a lower portion coupled to the upper portion. The upper portion may comprise an upper body, a cap covering a top portion of the upper body, and a diffuser module set within a front wall of the upper body, the diffuser module comprising a light source. The lower portion may comprise a lower body surrounding a first cavity, wherein the upper portion fits within the first cavity when the upper portion is in a recessed position and wherein the upper portion extends from the first cavity when the upper portion is in an extended position, and an extension mechanism coupled to the upper portion and the lower portion, the extension mechanism configured to extend the upper portion from the recessed position to the extended position.

In another embodiment, the lighting system comprises an illumination device. The illumination device may comprise illumination means for illuminating a truck bed, extending means for extending the illumination means from a stake cavity of the truck, and power means for providing power to the illumination means.

DETAILED DESCRIPTION

Described herein are various embodiments of a retractable truck bed lighting system. The lighting system may comprise a lighting module. The lighting module may comprise an upper portion and lower portion. When retracted, the upper portion may fit within the lower portion. When extended, the upper portion may extend above the lower portion. The upper portion may be extended using an extension mechanism. The extension mechanism may be a spring loaded push-push button, a motor, a ratcheting mechanism, or some other mechanism for moving the upper portion from a recessed position to an extended position.

The upper portion may have a diffuser module. The diffuser module may be hinged such that the diffuser module extends at an angle from the upper portion when the upper portion is extended from the lower portion. The diffuser module may recess into the upper portion when the upper portion is recessed into the lower portion. The diffuser portion may contain a light source. The light source may be an incandescent bulb, a fluorescent bulb, a light-emitting diode (LED), or some other device that provides illumination.

The extension mechanism and/or the light source may be powered by a power source. The power source may be external to the lighting module or may be internal to the lighting module. In an embodiment, the power source may be a battery. The battery may be disposable or rechargeable. Electrical contacts on the lighting module may make contact with electrical contacts in a cavity where the lighting module is installed. The battery may be recharged when the contacts are in contact. In an embodiment, contactless recharging of the battery may be used, for example inductive charging may be used. If no battery is present, electrical contacts on the lighting module may make contact with electrical contacts in a cavity where the lighting module is installed to provide power to the light source. Also, if no battery is present, contactless power may be provided to the lighting module to power the light source, for example, wireless power transfer.

Figure 1:
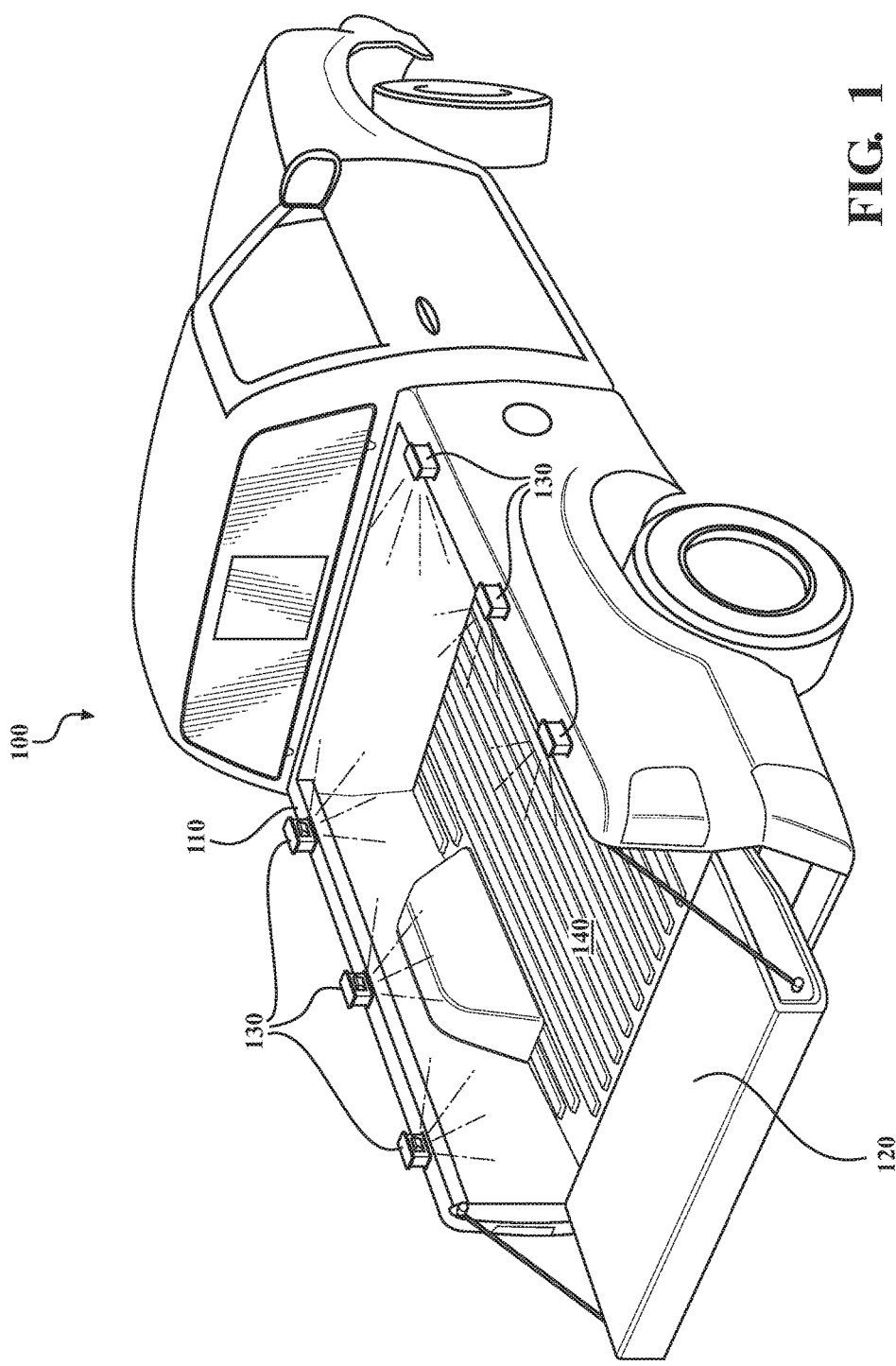
FIG. 1 is a diagram of an embodiment of a truck with bed lighting system.

FIG. 1 is a diagram of an embodiment of a truck with bed lighting system 100. The truck bed 140 may comprises a side wall 110. Side wall 110 may have one or more lighting modules 130 installed. As pictured, the lighting modules 130 are in use and extended above the top of side wall 110. Lighting modules 130 may extend from a recessed position when tailgate 120 is opened. Lighting modules 130 may extend when activated by a switch or other activation mechanism inside the cab of the truck and/or on the exterior of the truck. Light from lighting modules 130 may be focused on the bed 140 of the truck. In an embodiment, lighting modules 130 may be rotated such that the light from lighting modules 130 may illuminate the area surrounding the truck. In other embodiments, lighting modules 130 may be installed in cavities of a truck with a flatbed where the cavities are in the flatbed. In yet other embodiments, lighting modules 130 may be installed in any truck where an area needs illumination. For example a box truck, or other cargo carrying truck.

Figure 2:
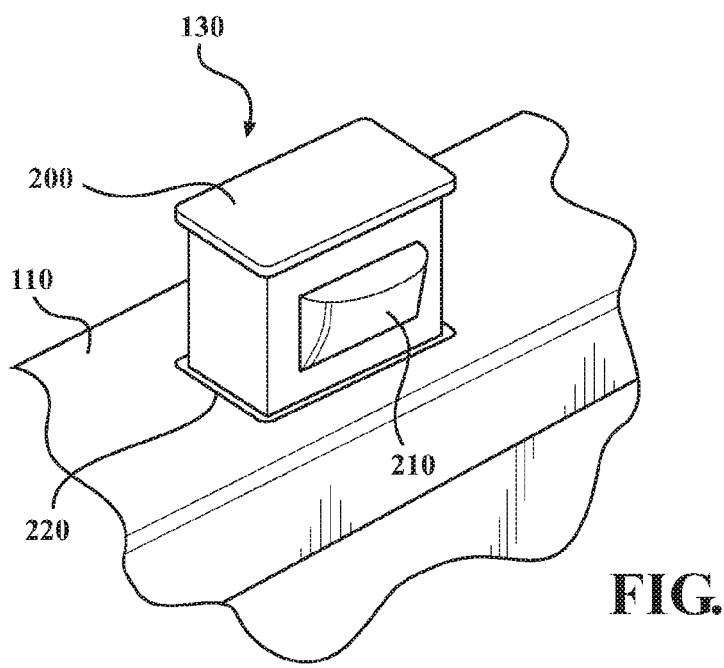
FIG. 2 is a diagram of an embodiment of a lighting module installed in a side wall.

FIG. 2 is a diagram of an embodiment of a lighting module 130 installed in side wall 110. Side wall 110 may comprise a cavity 220. Cavity 220 may be a stake cavity or some other cavity. Lighting module 130 may comprise a diffuser portion 210. Diffuser portion 210 may contain a light source (not pictured). The light source may be an incandescent bulb, light-emitting diode (LED), fluorescent bulb, halogen bulb, or some other light source. Lighting module 130 may comprise a cap 200. Cap 200 may be sized larger than the cavity 220. In an embodiment, when lighting module 130 is recessed in cavity 220, cap 200 may cover the opening of cavity 220. Covering the opening of cavity 220 with cap 200 may prevent rain, dust, and other contaminants from extended contact with the lighting module 130.

Figure 3:
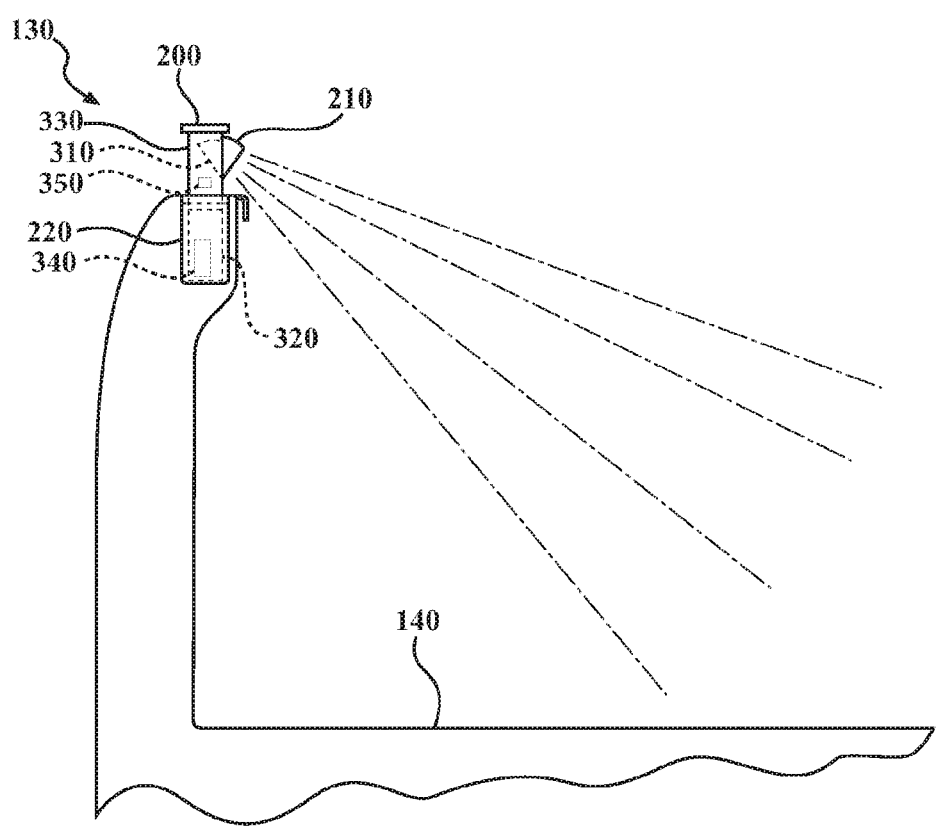
FIG. 3 is a diagram of an embodiment of a rear view of a lighting module installed in a truck.

FIG. 3 is a diagram of an embodiment of a rear view of lighting module 130 installed in a truck side rail. Diffuser portion 210 may extend from void 310 when the lighting module 130 is extended from cavity 220. When the lighting module 130 is recessed into cavity 220, diffuser portion 210 may fold into void 310. Diffuser portion 210 may be connected using a hinge or other mechanism to allow movement of diffuser portion 210 into and out of void 310. When diffuser portion 210 is extended, light from diffuser portion 210 may illuminate truck bed 140. In an embodiment, diffuser portion 201 may be in a fixed position within the upper portion 330. In this case, diffuser portion may be fixed at an angle to illuminate truck bed 140.

The upper portion 330 of lighting module 130 may recess into a lower portion 320 of lighting module 130. The upper portion 330 may have a smaller size than the lower portion 320, such that the upper portion 330 may be contained inside lower portion 320 when upper portion 330 is recessed. Lighting module 130 may be constructed of plastics, metals, glass, or any combination thereof.

Lighting module 130 may comprise an extension mechanism 340. Extension mechanism 340 may hold upper portion 330 in an extended position and/or aid in extending upper portion 330 to the extended position. In an embodiment, extension mechanism 340 may be a push-push mechanism. In another embodiment, extension mechanism 340 may be a ratchet type mechanism. In yet another embodiment, extension mechanism 340 may be a motor. The preceding are examples and not meant to be an exhaustive list of extension mechanisms and other extension mechanisms may be used. Extension mechanism 340 may be installed in upper portion 330, lower portion 320, or both.

Lighting module 130 may comprise a power source 350. Power source 350 may provide power to the light source and/or the extension mechanism 340 as needed. In an embodiment, power source 350 may be a battery. The battery may be rechargeable or disposable. The battery may be recharged wirelessly or via a connection on the exterior of lighting module 130. The connection may make contact with a power supply in cavity 210 provided by the truck. In another embodiment, power supply 350 may be a connection on the exterior of lighting module 130. The connection may make contact with a power supply in cavity 210 provided by the truck. In yet another embodiment, power source 350 may be a wireless power receiver, configured to receive power wirelessly from the truck. The preceding are examples and not meant to be an exhaustive list of power sources and other power sources may be used. Power source 350 may be installed in upper portion 330, lower portion 320, or both.

Figure 4:
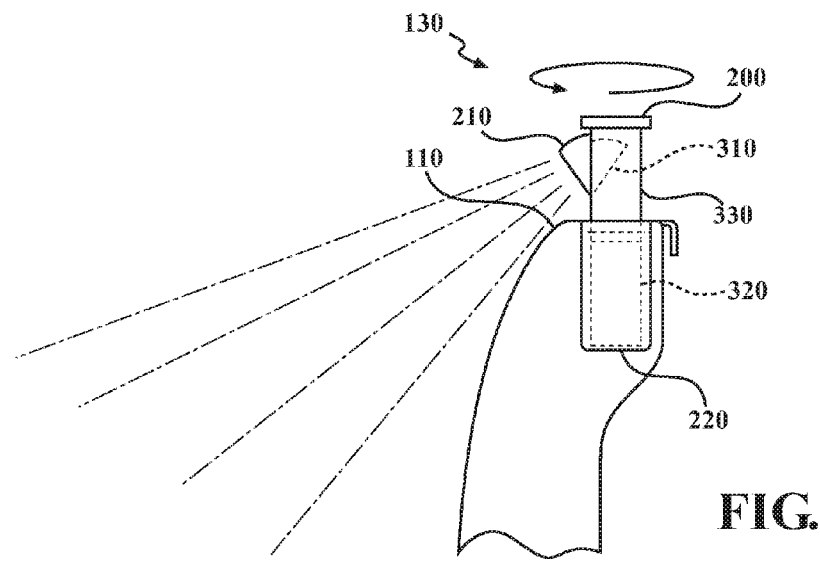
FIG. 4 is a diagram of an embodiment of a lighting module rotated 180 degrees.

FIG. 4 is a diagram of an embodiment of a lighting module 130 rotated. In an embodiment, lighting module 130 may be rotated such that the diffuser portion 210 faces outside of the truck bed 140. In this configuration, light from diffuser portion to 210 may shine on an area outside of the truck bed 140. In a situation where light is needed outside of the truck bed, a user may rotate lighting module 130. For example, if the truck has a flat tire, light may be desired outside of the truck bed 140. The user may remove lighting module 130 from cavity 220 and reinsert it after rotating it 180 degrees. In an embodiment, upper portion 330 may be coupled to lower portion 320 such that upper portion 330 may be rotated without removing lighting module 130 from cavity 220. In an embodiment, the rotating action may be mechanized. For example, a motor inside lighting module 130 may rotate upper portion 330.

Figure 5:
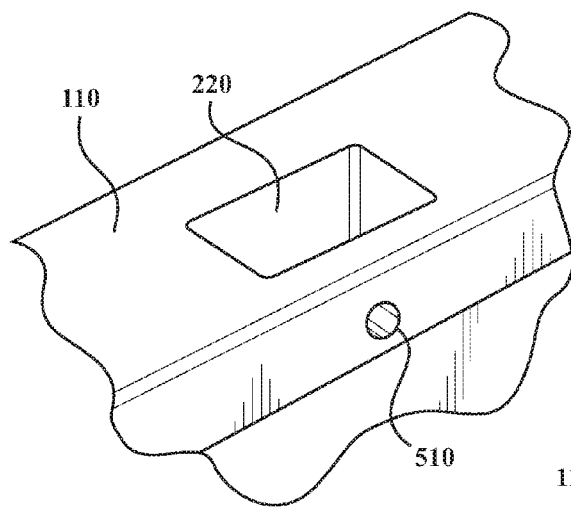
FIG. 5 as a diagram of an embodiment of a truck bed side wall with a stake cavity.
Figure 6:
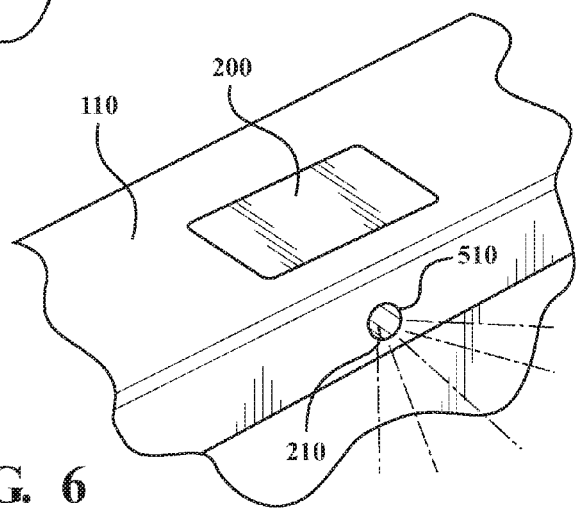
FIG. 6 is a diagram of an embodiment of a recessed lighting module installed in a truck bed side wall with a stake cavity.

FIG. 5 as a diagram of an embodiment of a truck bed side wall 110. The sidewall 110 may contain a cavity 220, e.g., a stake cavity. The side wall 110 may have an opening 510. The opening 510 may be through sidewall 110 into cavity 220. FIG. 6 is a diagram of an embodiment of a recessed lighting module installed in a truck bed side wall with a stake cavity. In this embodiment a recessed lighting module may be installed in side wall 110. Cap 200 may sit flush on the top of side wall 110. In an embodiment, the lighting module may be activated and light may shine through opening 510. For example, a truck bed cover (not pictured) may prevent the lighting module from extending upward. A user may still desire lighting in the truck bed and may activate the lighting module while recessed allowing light to pass through opening 510.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details.

What is claimed is:

1. An illumination device comprising:
an upper portion comprising:
an upper body;
a cap covering a top portion of the upper body;
a diffuser module set within a front wall of the upper body, the diffuser module comprising a light source;
a lower portion coupled to the upper portion, the lower portion comprising:
a lower body surrounding a first cavity, wherein the upper portion fits within the first cavity when the upper portion is in a recessed position and wherein the upper portion extends from the first cavity when the upper portion is in an extended position; and
an extension mechanism coupled to the upper portion and the lower portion, the extension mechanism configured to extend the upper portion from the recessed position to the extended position,
wherein the upper portion is coupled to the lower portion using a rotatable coupler, and wherein the upper portion is rotatable at least 180 degrees.

2. The illumination device of claim 1, wherein the diffuser module is hinged to the front wall.

3. The illumination device of claim 2, wherein the diffuser module is configured to extend outward from the front wall when the upper portion is in the extended position, and wherein the diffuser module is configured to fit into a second cavity surrounded by the upper portion when the upper portion is in the recessed position.

4. The illumination device of claim 1 further comprising a power source.

5. The illumination device of claim 4, wherein the power source comprises a battery electrically coupled to the light source.

6. The illumination device of claim 4, wherein the power source comprises a first power contact, the power contact electrically coupled to the light source.

7. The illumination device of claim 6, wherein the first power contact is a wireless power receiver.

8. The illumination device of claim 6, wherein the first power contact is configured to contact a second power contact of a stake cavity of a truck.

9. The illumination device of claim 4, wherein the extension mechanism comprises a motor electrically coupled to the power source.

10. The illumination device of claim 1, wherein the extension mechanism comprises a push-push switch.

11. The illumination device of claim 1 further comprising a power switch.

12. The illumination device of claim 11, wherein the power switch is configured to switch to an on position when the upper portion is in the extended position.

13. The illumination device of claim 11, wherein the power switch is configured to switch to an on position in response to receiving a signal from a remote switch.

14. The illumination device of claim 11, wherein the power switch is configured to switch to an on position in response to receiving a signal from a local switch.

15. The illumination device of claim 1, wherein the lower portion is sized to fit within a stake cavity of a truck.

16. The illumination device of claim 1, wherein the light source is configured to illuminate when the upper portion is in the extended position.

17. The illumination device of claim 1, wherein the light source is configured to illuminate when the upper portion is in the recessed position.

18. The illumination device of claim 17, wherein the diffuser module is positioned adjacent to an opening surrounded by a side wall of a truck bed.

19. An illumination device comprising:
   an upper portion comprising:
      an upper body;
      a cap covering a top portion of the upper body;
      a diffuser module set within a front wall of the upper body, the diffuser module comprising a light source;
   a lower portion coupled to the upper portion, the lower portion comprising:
      a lower body surrounding a first cavity, wherein the upper portion fits within the first cavity when the upper portion is in a recessed position and wherein the upper portion extends from the first cavity when the upper portion is in an extended position; and
      an extension mechanism coupled to the upper portion and the lower portion, the extension mechanism configured to extend the upper portion from the recessed position to the extended position, and
   wherein the light source is configured to illuminate when the upper portion is in the recessed position.

20. The illumination device of claim 19, further comprising a power source, wherein the power source comprises a first power contact, the power contact electrically coupled to the light source, and wherein the first power contact is a wireless power receiver.

* * * * *